Figure 4:
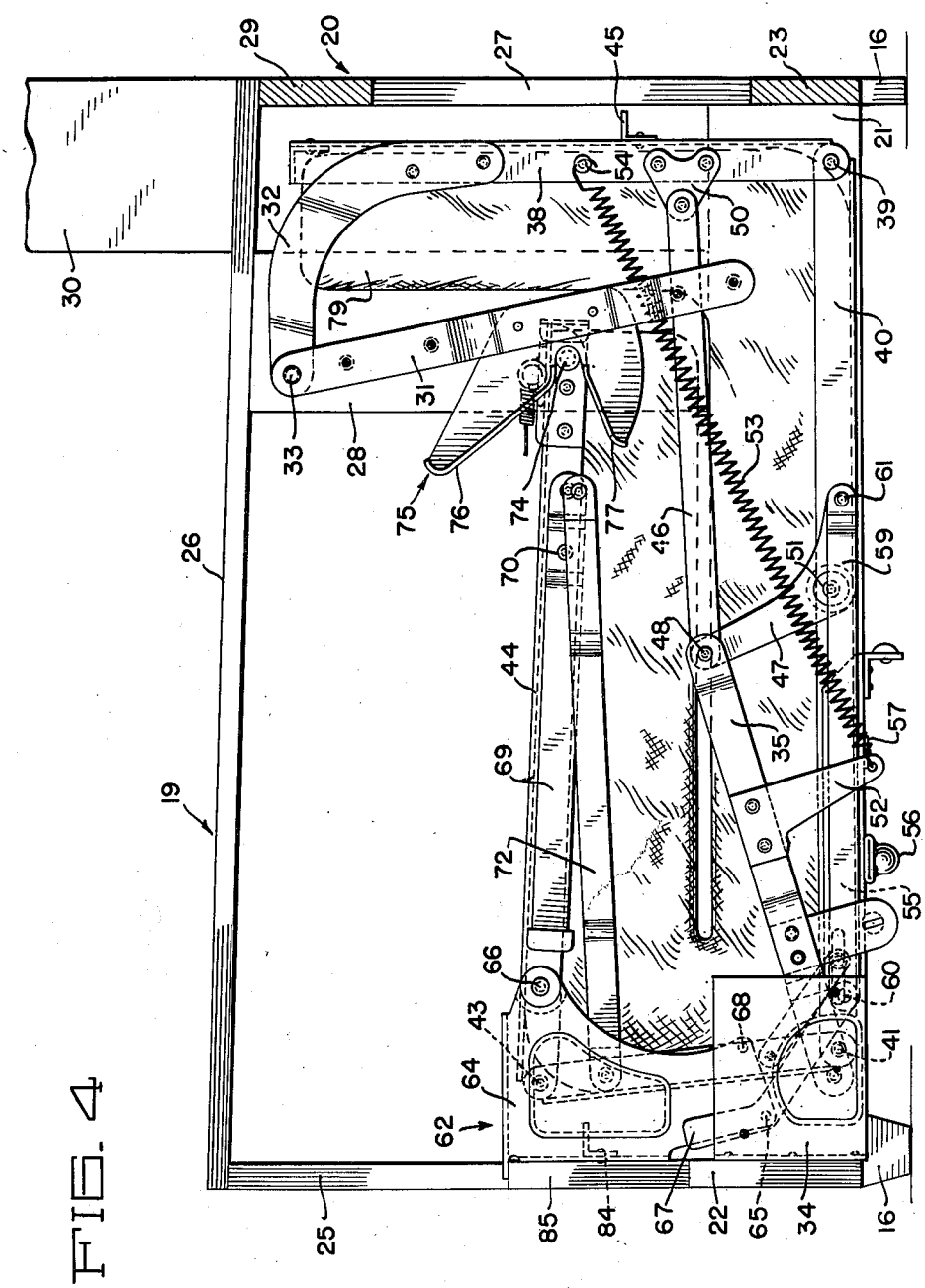

April 14, 1953    M. FOX    2,634,428
BED DAVENPORT
Filed April 7, 1951    6 Sheets-Sheet 1
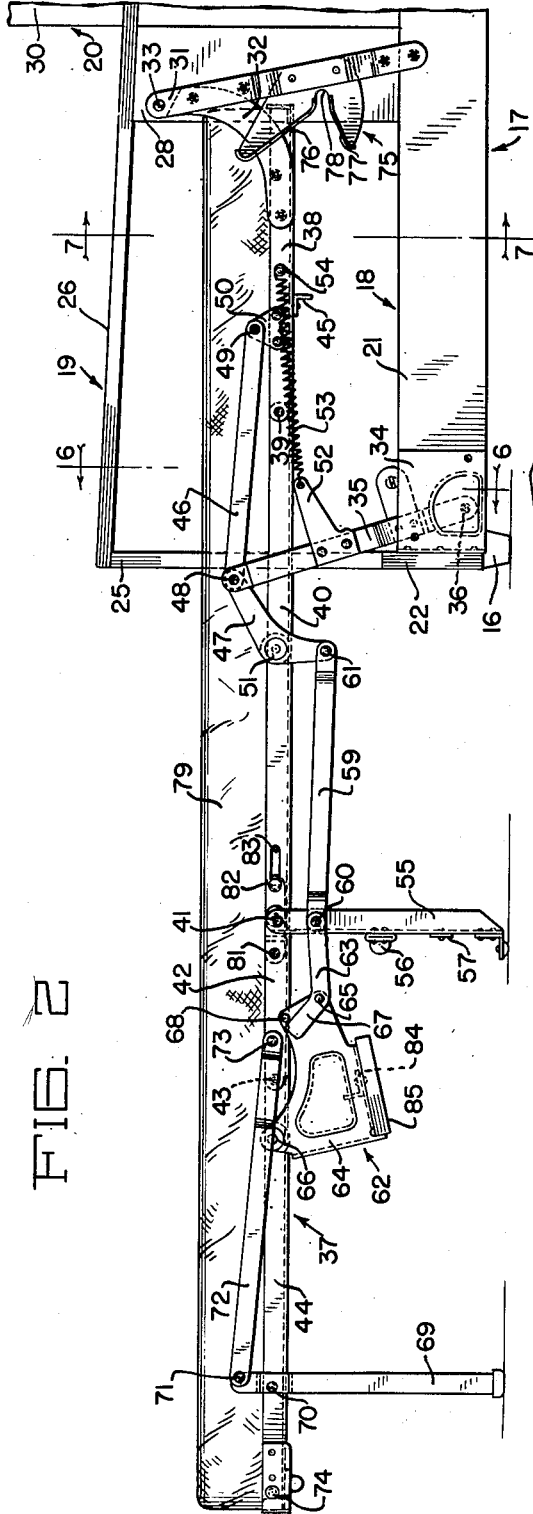
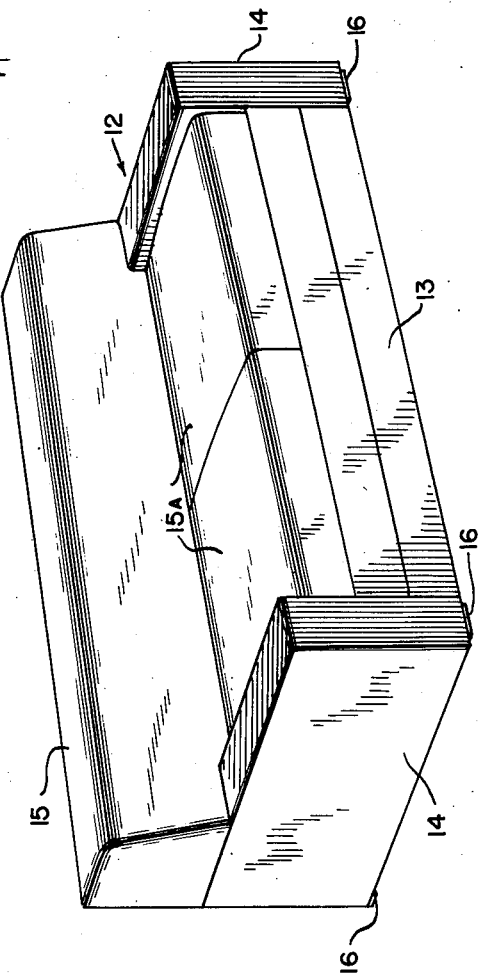
Inventor:
Martin Fox
By: Schroeder, Merriam,
Hofgren & Brady
Attorneys

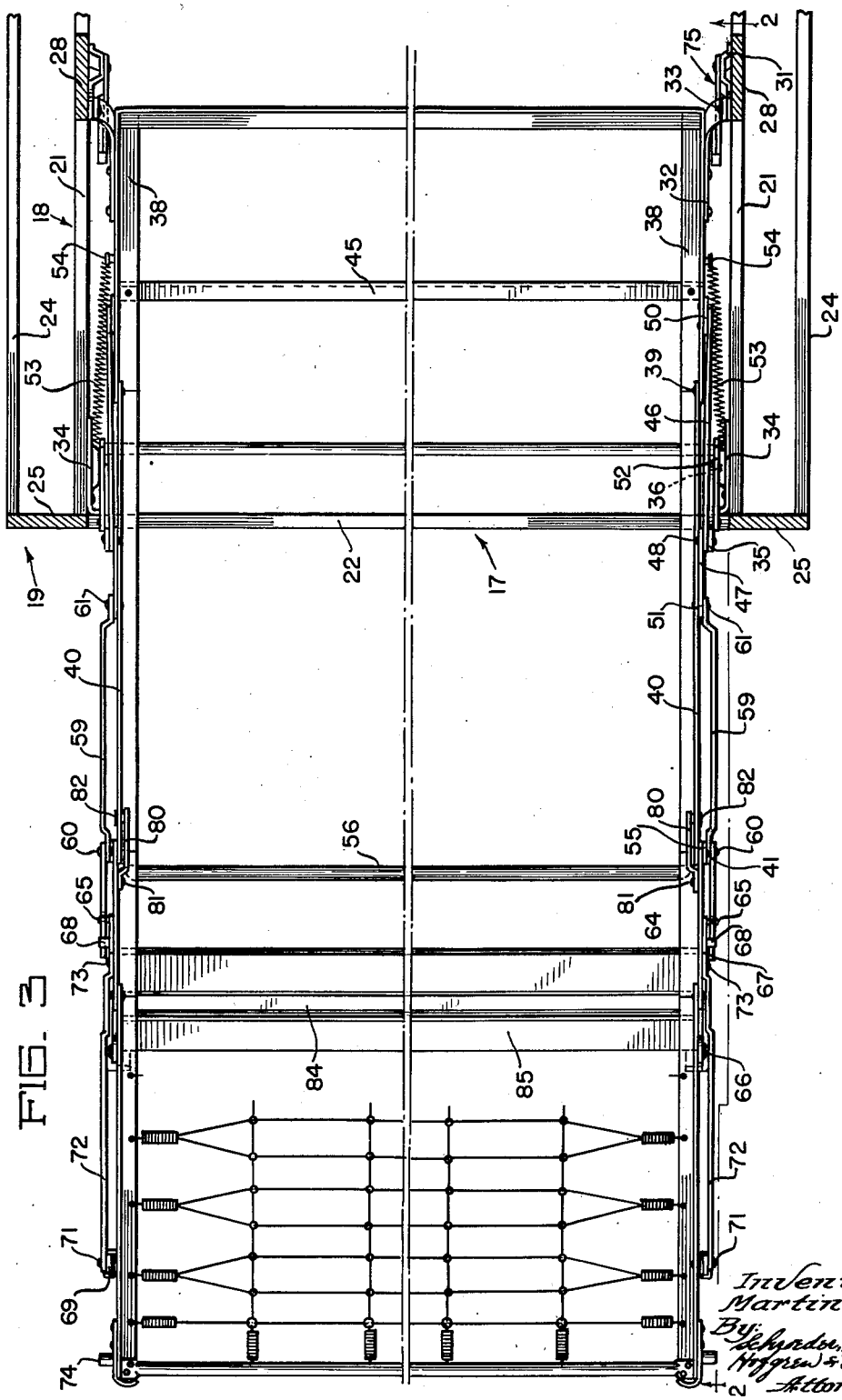

April 14, 1953

M. FOX 2,634,428

BED DAVENPORT

Filed April 7, 1951

6 Sheets-Sheet 3

Inventor:
Martin Fox
By Schroeder, Merriam,
Hofgren & Brady
Attorneys

April 14, 1953 M. FOX 2,634,428
BED DAVENPORT
Filed April 7, 1951 6 Sheets-Sheet 4
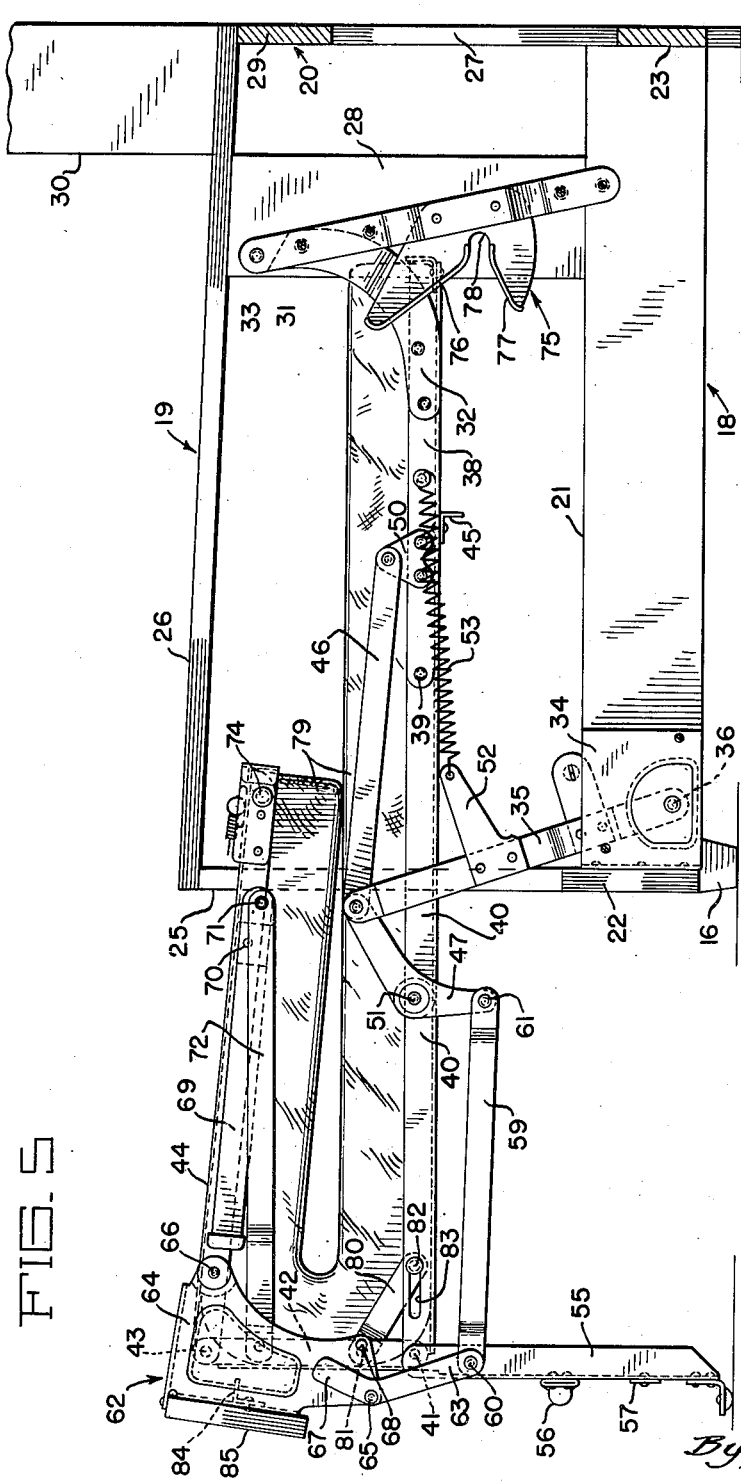
Inventor
Martin Fox
By Schroeder, Merriam,
Hofgren & Brady
Attorneys

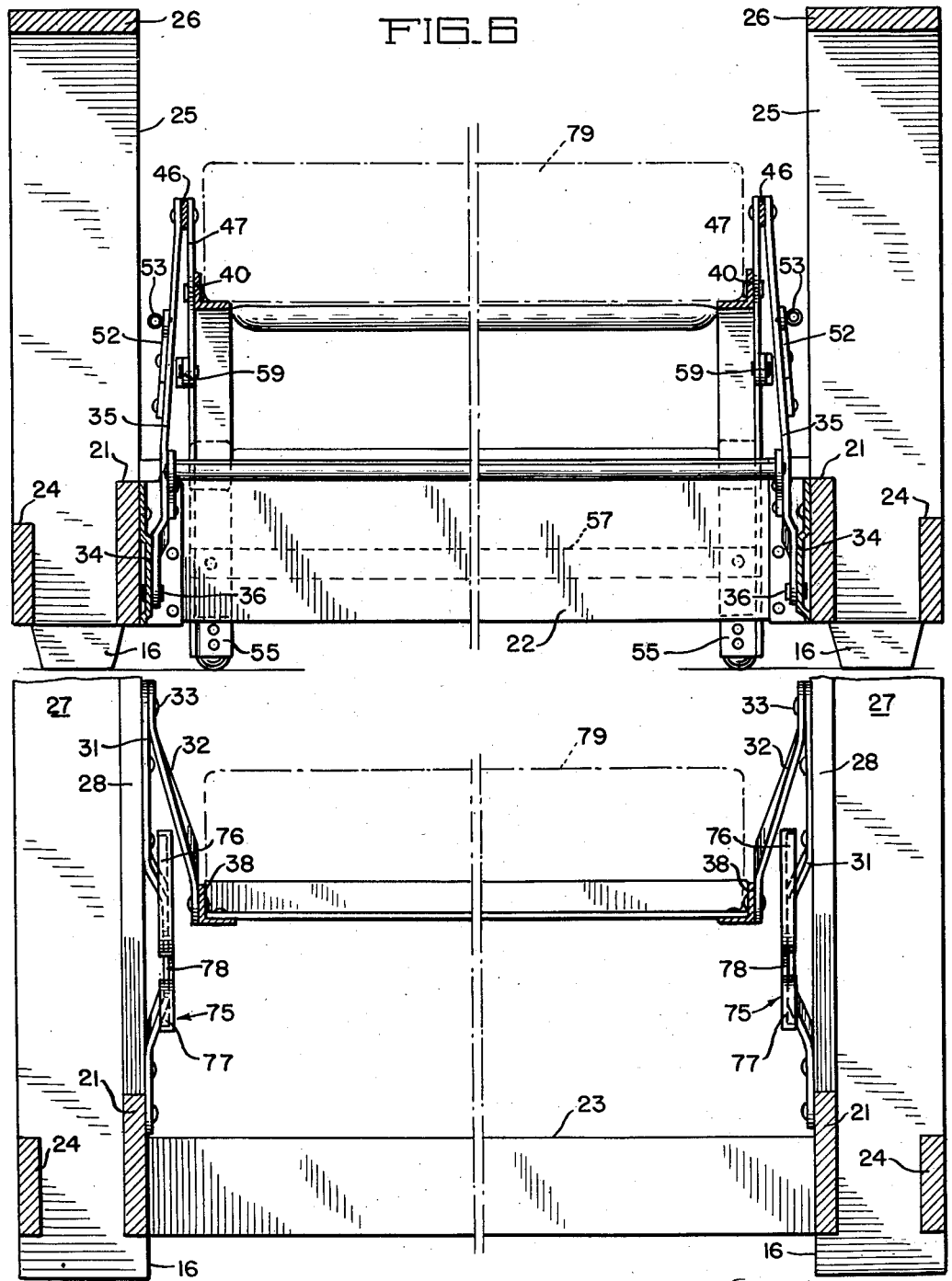

April 14, 1953      M. FOX      2,634,428
BED DAVENPORT
Filed April 7, 1951      6 Sheets-Sheet 6
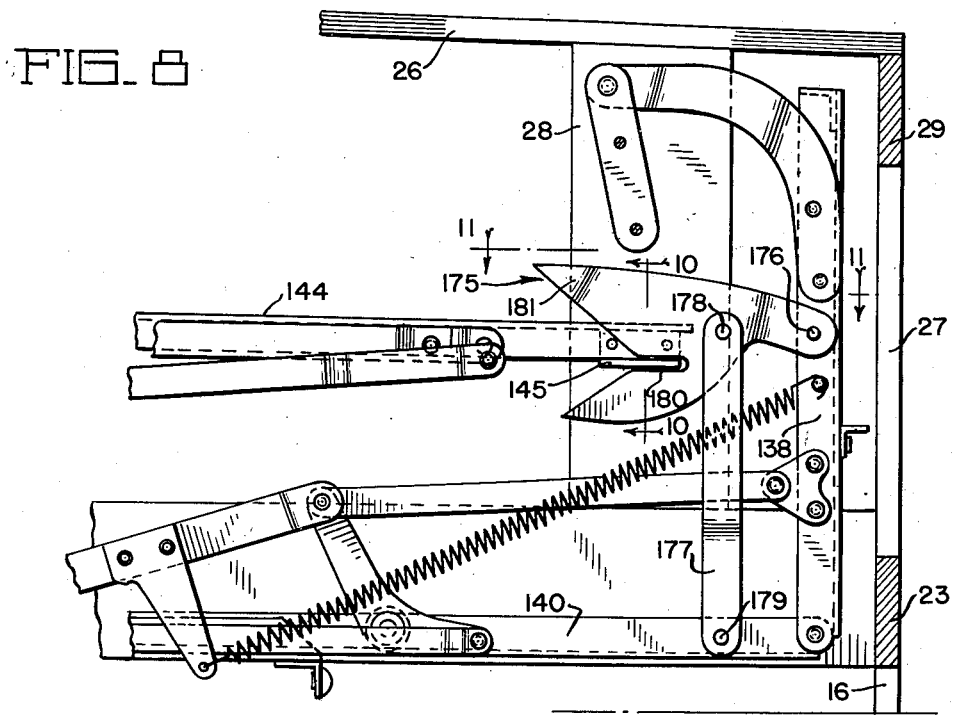
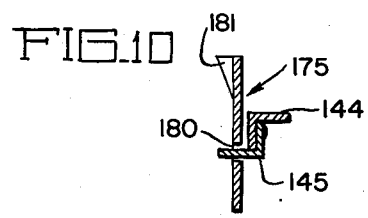
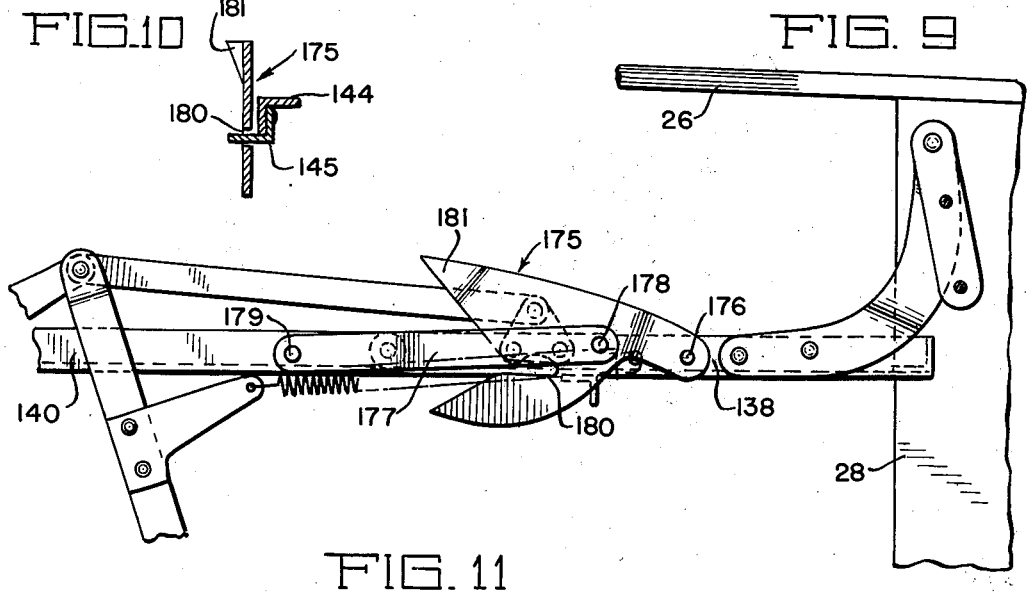
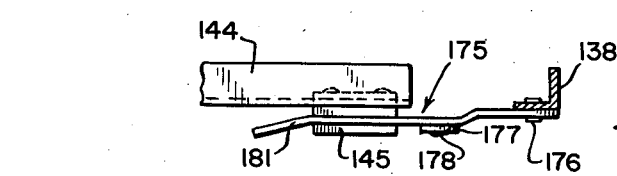

Patented Apr. 14, 1953

2,634,428

UNITED STATES PATENT OFFICE 2,634,428

BED DAVENPORT

Martin Fox, Chicago, Ill., assignor to The Seng Company, a corporation of Illinois Application April 7, 1951, Serial No. 219,828

13 Claims. (Cl. 5—13)

This invention relates to a bed davenport, and in particular it relates to a bed davenport of the type in which a folding and retractable bed structure composed of a plurality of articulated bed sections extends forwardly from the back of the davenport in bed position.

The primary object of the invention is to provide a rugged and fool-proof bed mechanism for a bed davenport which is firmly held both in davenport position and in bed position.

A further object is to provide a bed davenport in which the outermost bed section, which serves as a support frame for the cushions in davenport position, is held in a jaw-like member in davenport position so that it is always disposed at the same angle regardless of the thickness of the mattress.

A further object is to provide a mechanism in which flaring guide surfaces direct the free end of the outermost bed section into slots in said jaw-like members.

A further object is to provide a toggle linkage which prevents collapse of the two outermost bed sections about their pivots in bed position and which has stops to limit the upward travel of the toggle links so that the bed sections cannot jackknife as the bed is folded.

The invention is illustrated in a preferred and an alternative embodiment in the accompanying drawings, in which:

Fig. 1 is a perspective view of a davenport bed in davenport position; Fig. 2 is a longitudinal sectional view taken as indicated along the line 2—2 of Fig. 3, showing the preferred bed structure in bed position; Fig. 3 is a fragmentary plan view showing the preferred bed structure in bed position; Fig. 4 is a sectional view like Fig. 2, but showing the bed structure in davenport position; Fig. 5 is a sectional view like Fig. 4 showing an intermediate position of the bed structure; Figs. 6 and 7 are sections taken as indicated along the lines 6—6 and 7—7 respectively, of Fig. 2; Fig. 8 is a fragmentary sectional view like Fig. 4, but showing a modified arrangement of the holding jaw with the device in davenport position; Fig. 9 is a fragmentary sectional view of the device of Fig. 8 in bed position; and Figs. 10 and 11 are sections taken as indicated along the lines 10—10 and 11—11, respectively, of Fig. 8.

Referring to the drawings in greater detail, and referring particularly to Fig. 1, a davenport 12 consists generally of a base 13, upholstered arms 14 and an upholstered back 15 all supported on feet 16. The device has a pair of loose seat cushions 15a. As best seen in Figs. 2–5 inclusive, the davenport 12 has a composite frame indicated generally at 17, which includes a central frame 18, arm frames 19 and a back frame 20. The central frame 18 is rectangular and is composed of end rails 21, a front rail 22 and a back rail 23. Each arm frame includes a pair of outer frame members 24, a pair of upstanding front members 25, a pair of top members 26 and a pair of rear members 27 which combine to form upstanding generally rectangular frames at the ends of the central frame 18. The back frame has end bars 28, a transverse upper bar 29, and end boards 30, the end bars 28 being positioned forwardly of the end boards 30 and transverse bar 29.

It is to be understood that the folding and retractable bed structure is a complete unit which is fastened into the davenport frame by means of a plurality of attaching elements. The davenport frame is not a part of this invention, and the bed structure is ordinarily fabricated separately and sold to a furniture manufacturer who incorporates it into a bed davenport. As best seen in Fig. 2, the attaching elements include a pair of rear attaching members 31 which fasten to the end bars 28 of the back frame and from which the head of the bed structure is pivotally supported upon a pair of swinging arms 32 which are pivoted at 33. A pair of front attaching angle plates 34 fasten to the inner faces of the end rails 21 of the central frame and to the adjacent end portions of the front rail 22.

A supporting arm 35 is pivoted on each of the front attaching plates 34 at 36, said supporting arms 35 providing support for portions of a bed frame, which is indicated generally at 37, and also providing a part of the mechanism by means of which the bed is retracted and extended, as will be described hereinafter.

The bed frame 37 has four articulated bed sections which may be moved between the bed position shown in Fig. 2 and the davenport position shown in Fig. 4. A rear bed section 38 is riveted to the swinging arms 32, and has pivots 39 at its forward end to make pivotal connection with a rear intermediate bed section 40. The rear intermediate bed section 40 has pivots 41 at its forward end to make a pivotal connection with a front intermediate bed section 42, and the front intermediate section 42 is pivotally connected at 43 to a front bed section 44, which also is the supporting frame for the seat cushions 15a in davenport position. Each bed section is a simple rectangular frame formed of angle members, and suitable cross braces are provided such as the rear section cross brace 45.

Since identical operating mechanisms are provided for each side of the bed frame, only a single set will be described in detail. The supporting and actuating mechanism for the front portion of the rear bed section 38 and the rear of the rear intermediate bed section 40 comprises a long link 46 and a bell crank 47 both of which are carried on a common pivot 48 at the top of the supporting arm 35. The long link 46 is pivotally connected at 49 to a pivot plate 50 which projects upwardly from the side of the rear bed section 38, while the bell crank 47 is pivotally connected at 51 to the rear intermediate bed section 40. A spring receiving arm 52 on the supporting arm 35 has a tension spring 53 which extends to a spring lug 54 on the rear bed section 38, the spring 53 serving to aid in the initial forward movement of the bed structure from davenport position toward bed position.

At the outer end of the rear intermediate bed section 40 are a pair of intermediate legs 55 which are provided with suitable cross braces 56 and 57, the intermediate legs 55 being mounted on the pivots 41 which connect the rear intermediate section 40 and the front intermediate section 42. An operating link 59 is pivoted at 60 to an intermediate leg 55, and at 61 is pivoted to the downwardly projecting arm of the bell crank 47.

Each intermediate leg 55 is linked to the rear portion of the front bed section 44 by means of a toggle indicated generally at 62, said toggle consisting of a link 63 which is mounted on the pivot 60 of the intermediate leg 55, and a plate 64 which is pivoted at 65 to the link 63, and at 66 to the front bed section 44. The link 63 has a projecting arm 67 which cooperates with a stop pin 68 on the plate 64 to limit upward movement of the toggle 62.

A pair of front legs 69 are pivoted to the front bed section 44 at 70, and have pivots 71 at their upper ends to accommodate operating links 72 which are also pivotally connected at 73 to the front intermediate bed section 42.

As best seen in Fig. 4, the outer end portion of the front bed section 44, which is the rear portion when the section 44 is serving as a support frame in davenport position, is provided with a pair of laterally extending studs 74 which rest in jaw-like members, indicated generally at 75, when the bed structure is in davenport position, the jaw-like members 75 being riveted to the rear attaching members 31. Each of the jaw-like members has an upper guide surface 76 and a lower guide surface 77 which converge rearwardly to guide the studs 74 into U-shaped notches 78 at the rear of the jaw-like members 75 as the bed structure completes its movement to davenport position. The bed is provided with a mattress 79, and as seen in Fig. 4, the mattress is folded upon itself when the bed structure is in davenport position. The notches 78 of the jaw-like members 75 serve to positively position the studs 74, and thus the front bed section 44 and seat cushions 15a, in davenport position. Were it not for the U-shaped notches 78, the position of the free end of the front bed section 44 in davenport position would depend upon the thickness of the mattress 79, as the front bed section 44 would be supported only by the mattress in davenport position. With a thin mattress the free end would drop low and with a thick mattress it would be supported in too high a position. The location of the U-shaped notches 78 is such as to give the correct pitch to the davenport seat cushions which are supported upon the inverted front bed section 44 when the bed is in davenport position.

Assuming the bed structure to be in bed position, as shown in Fig. 2, the folding of the bed to davenport position is accomplished in the following manner. The outer end of the front bed section 44 is grasped and raised to rotate that bed section and the front intermediate bed section 42 upwardly about the pivots 41. Any tendency of the bed sections 44 and 42 to fold in the wrong direction about the pivot 43 is prevented by the stop pins 68 and cooperating arms 67 of the toggles 62 so that as the front bed section is elevated the toggles 62 break downwardly about their pivots 65 and the front bed section 44 pivots upwardly about the pivots 43. The first step in folding the bed carries it to the position shown in Fig. 5, in which position the front legs 69 have been retracted by the action of the links 72, and the free end of the front bed section 44 is supported by the mattress 79. As seen in Fig. 5, a sliding link 80 is pivoted to the front intermediate bed section at 81 and has a headed stud 82 engaging a slot 83 adjacent the front of the rear intermediate bed section to limit the rearward pivotal movement of the structure about the pivots 41.

A cross brace 84 extends between the toggle plates 64, to receive a trim board 85. To complete the folding of the bed structure, the trim board 85 may be grasped from above to start the rearward swinging movement of the bed structure toward davenport position. During this operation, the supporting arms 35 turn rearwardly about their pivots 36, and the long links 46 and bell cranks 47 serve to fold the rear bed section 38 and rear intermediate bed section 40 about their pivot 39, and at the same time the rear bed section 38 swings toward an upright position on the arms 32. Simultaneously, the links 59 which extend from the bell cranks 47 to the intermediate legs 55 pivot said legs rearwardly about their pivots 58 as the bell cranks are rotated on their pivots 51 by the action of the supporting arms 35. The bed structure moves smoothly into the davenport position shown in Fig. 4, and the structure is in almost a locked condition in davenport position due to the toggling action between the supporting arms 35 and the long links 46 in that position. As the members 35 and 46 approach a dead center position about their pivots 48, the studs 74 on the free end of the front bed section 44 are guided along the guide surfaces of the jaw-like members 75 into the U-shaped notches 78. If the mattress 79 is thin, the lower guide surfaces 77 will move the free end of the front bed section upwardly into the notches 78, and if the mattress 79 is thick, the upper guide surfaces 76 will slide the free end of the bed section 44 downwardly into the notches 78. The rearward movement of the bed structure is stopped by the notches 78, and in davenport position the trim board 85 which extends between the plates 64 is flush with the front rail 22 of the central davenport frame 18.

The modified form of the device which is shown in Figs. 8 to 11, inclusive, is identical with the preferred form, except for the arrangement of the jaw-like members, which will here be designated by the numeral 175. The jaw-like members 175 are pivoted at 176 to the sides of the rear bed section 138, and links 177 are pivotally connected at 178 to the jaw-like members and at 179 to the sides of a rear intermediate bed section 140. As seen in Figs. 8 and 10, the links 177 serve to retain the jaw-like member 175 in a forwardly facing position in both the bed position and the davenport position of the bed structure. The jaw-like members 175 have U-shaped notches 180 which, in the particular embodiment shown, are long slots; and the front bed section 144 has outwardly extending angle members 145 which are engaged by the U-shaped slots 180. As seen in Fig. 11, the outer extremity 181 of the upper portion of the member 175 is bent outwardly to provide clearance for bedding at the foot of the mattress 79 as the bed is moved to davenport position.

The foregoing detailed description is given for clearness of understanding only and no unnecessary limitations are to be understood therefrom, as some modifications will be obvious to those skilled in the art.

I claim:

1. Folding and retractable bed structure adapted to be secured to the frame of a davenport bed, comprising: a pair of rear attaching members for attachment to a rear part of a davenport frame; a bed frame having four articulated bed sections constructed for movement between a folded davenport position and a planar bed position, said frame including a rear section pivoted on said rear attaching members, a rear intermediate section, a front intermediate section, and a front section; a pair of front attaching plates for attachment to a front part of the davenport frame; a supporting arm pivoted on each of said plates and extending above the plane of said bed frame in bed position; linkage means extending from the upper end of each supporting arm to said rear and rear intermediate sections, said linkage means being constructed and arranged to suspend said sections in bed position and direct their folding into davenport position; a pair of folding front legs on said front bed section; a pair of intermediate legs pivoted on the rear intermediate section; a linkage to draw each of said pairs of legs rearwardly as the bed frame is moved toward davenport position; and a pair of links on each side of said bed frame forming a toggle which links the front section to one of said intermediate legs, said toggle links having interengaging means limiting upward movement.

2. The bed structure of claim 1 in which the links forming each toggle comprise a plate having a stop stud and a bar having a projecting arm to contact said stud as the toggle moves upwardly.

3. The bed structure of claim 1 in which a pair of forwardly facing jaw-like members are secured to a part of the structure which is adapted to be positioned adjacent the rear of the davenport frame, said members having converging guide surfaces terminating in U-shaped recesses which receive portions of the free end of the front section so as to positively position and support said free end of said section in davenport position.

4. The bed structure of claim 1 in which the free end portion of the front section has a pair of laterally projecting elements, and a pair of forwardly facing jaw-like members are secured to a part of the structure which is adapted to be positioned adjacent the rear of the davenport frame, said members having converging guide surfaces terminating in U-shaped recesses in which said laterally projecting elements are fixedly retained and supported in davenport position.

5. The bed structure of claim 1 in which the free end portion of the front section has a pair of laterally projecting elements, and a pair of forwardly facing, jaw-like members are secured to the rear attaching members, said jaw-like members having converging guide surfaces terminating in U-shaped recesses in which said laterally projecting elements are fixedly retained in davenport position.

6. The bed structure of claim 1 in which the free end portion of the front section has a pair of laterally projecting elements, and a pair of forwardly facing jaw-like members is pivotally mounted on the sides of the rear section, said members having converging guide surfaces terminating in U-shaped recesses in which said laterally projecting elements are fixedly retained in davenport position, and links are provided to maintain said members in their forwardly facing position in both davenport and bed positions.

7. Folding and retractable bed structure adapted to be secured to the frame of a davenport bed, comprising: a pair of rear attaching members for attachment to a rear part of a davenport frame; a bed frame having four articulated bed sections constructed for movement between a folded davenport position and a planar bed position, said frame including a rear section pivoted on said rear attaching members, a rear intermediate section, a front intermediate section, and a front section which provides a support frame for seat cushions in davenport position; a pair of front attaching plates for attachment to a front part of the davenport frame; a supporting arm pivoted on each of said plates and extending above the plane of said bed frame in bed position; linkage means extending from the upper end of each supporting arm to said rear and rear intermediate sections, said linkage means being constructed and arranged to suspend said sections in bed position and fold them to davenport position; a pair of folding front legs on said front bed section; a pair of intermediate legs pivoted on the rear intermediate section; a linkage to draw each of said legs rearwardly as the bed frame is moved toward davenport position; linkages between the front section and the intermediate legs; and a pair of forwardly facing, jaw-like members adjacent the rear of the davenport frame, said members having converging guide surfaces terminating in U-shaped recesses in which parts of the free end of the front section are fixedly retained and supported in davenport position.

8. The bed structure of claim 7 in which the jaw-like members are secured to the rear attaching members.

9. The bed structure of claim 7 in which the jaw-like members are pivotally mounted on the sides of the rear section, and links are provided to maintain said members in their forwardly facing positions in both davenport and bed positions.

10. In a folding and retractable bed structure adapted to be attached to the frame of a davenport bed and having a plurality of articulated bed frame sections one of which is a support frame for seat cushions in davenport position, a pair of forwardly facing, jaw-like members positioned adjacent the rear of the davenport frame, said members having converging guide surfaces terminating in U-shaped recesses which receive rear portions of said support frame so as to positively position and support the rear of the support frame in davenport position.

11. The structure of claim 10 in which the jaw-like members are secured to fixed portions of said bed structure.

12. The structure of claim 10 in which the jaw-like members are pivoted on the sides of one of the articulated bed frame sections, and linkages are operatively attached to said members to maintain them in their forwardly facing positions when the bed structure is in daveport position and when it is in bed position.

13. Folding and retractable bed structure adapted to be secured to the frame of a davenport bed, comprising: a pair of rear attaching members for attachment to a rear part of a davenport frame; a bed frame having four articulated bed sections constructed for movement between a folded davenport position and a planar bed position, said frame including a rear section pivoted on said rear attaching members; a rear intermediate section; a front intermediate section; and a front section; a pair of front attaching plates for attachment to a front part of the davenport frame; means pivoted on each of said attaching plates to direct the movement of the rear and rear intermediate bed sections between davenport position and bed position; a pair of folding front legs on said front bed section; a pair of intermediate legs pivoted on the rear intermediate section; a linkage to draw each of said pairs of legs rearwardly as the bed frame is moved toward davenport position; and a pair of links on each side of said bed frame forming a toggle which links the front section to one of said intermediate legs, said toggle links having interengaging means limiting upward movement.

MARTIN FOX.

References Cited in the file of this patent

UNITED STATES PATENTS

| Number | Name | Date |
| --- | --- | --- |
| 1,120,911 | Davis | Dec. 15, 1914 |
| 1,213,380 | Karpen | Jan. 23, 1917 |
| 1,256,325 | Karpen et al. | Feb. 12, 1918 |
| 1,270,839 | Kelly | July 2, 1918 |
| 2,136,830 | Vallone | Nov. 15, 1938 |
| 2,352,989 | Woller | July 4, 1944 |
| 2,505,989 | Pokorney et al. | May 2, 1950 |

FOREIGN PATENTS

| Number | Country | Date |
| --- | --- | --- |
| 767,913 | France | May 7, 1934 |